United States Patent
Cressy

(10) Patent No.: US 7,594,480 B2
(45) Date of Patent: Sep. 29, 2009

(54) DEODORIZER/DISINFECTANT FLUID TREATMENT SYSTEM AND LITTER LINER FOR USE THEREWITH

(76) Inventor: Laura Sutis Cressy, 132 Coffee St., Mandeville, LA (US) 70448

(*) Notice: Subject to any disclaimer, the term of this patent is extended or adjusted under 35 U.S.C. 154(b) by 0 days.

(21) Appl. No.: 12/206,441

(22) Filed: Sep. 8, 2008

(65) Prior Publication Data

US 2009/0064940 A1 Mar. 12, 2009

Related U.S. Application Data

(63) Continuation of application No. 11/094,020, filed on Mar. 30, 2005, now abandoned.

(51) Int. Cl.
*A01K 29/00* (2006.01)

(52) U.S. Cl. .............. 119/161; 119/170; 119/167; 119/163; 119/165

(58) Field of Classification Search ................. 119/161, 119/163, 165, 167, 170
See application file for complete search history.

(56) References Cited

U.S. PATENT DOCUMENTS

| | | | |
|---|---|---|---|
| 1,768,891 A * | 7/1930 | Davis et al. ............ 422/186.07 |
| 1,890,163 A | 12/1932 | Mann ........................ 119/28.5 |
| 3,793,989 A | 2/1974 | Clark ........................ 119/165 |
| 3,918,404 A | 11/1975 | Bunger | |
| 3,978,818 A | 9/1976 | Heldenbrand | |
| 4,064,300 A | 12/1977 | Bhangu | |
| 4,546,727 A | 10/1985 | Andersen ................. 119/165 |
| 4,649,862 A * | 3/1987 | Neary ....................... 119/168 |
| 4,696,257 A | 9/1987 | Neary et al. ............. 119/166 |
| 4,784,082 A | 11/1988 | Wolfe | |
| 4,836,141 A | 6/1989 | Whitfield | |
| 4,842,829 A | 6/1989 | Hirai et al. | |
| 5,015,394 A | 5/1991 | McEllhenney et al. | |
| 5,038,721 A | 8/1991 | Ouellette et al. ........... 119/167 |
| 5,082,518 A | 1/1992 | Molinaro | |
| 5,193,488 A | 3/1993 | Walton ..................... 119/166 |
| 5,315,964 A | 5/1994 | Mimms et al. | |
| 5,511,513 A | 4/1996 | Baron et al. ............... 119/163 |
| 5,624,635 A | 4/1997 | Pryor | |
| 5,713,137 A | 2/1998 | Fujita ........................ 34/106 |
| 5,755,181 A | 5/1998 | Petkovski ................. 119/163 |
| 5,794,566 A | 8/1998 | Goetz et al. .............. 119/161 |
| 5,908,601 A | 6/1999 | Lin | |
| 5,983,832 A | 11/1999 | Seo | |
| 5,983,834 A * | 11/1999 | Tai ........................... 119/448 |
| 6,009,836 A | 1/2000 | Neary et al. | |
| 6,079,364 A | 6/2000 | Tamba ...................... 119/163 |

(Continued)

*Primary Examiner*—Andrea M Valenti
*Assistant Examiner*—Kristen C Hayes
(74) *Attorney, Agent, or Firm*—Joseph T Regard, Ltd Plc

(57) ABSTRACT

A system for lining a container or the like containing an absorbent, utilizing the liner to contain and direct a treatment fluid into the absorbent to disinfect and renew. A complimentary system to the present invention teaches a deodorization, disinfectant, treatment bin for treating litter infused with animal waste, which treatment bin includes a treatment area utilizing ozone to contain and treat the contaminated litter, rendering same re-useable. The system of the present invention further contemplates an ozone generator having a timer circuit for providing a flow of ozone to the apparatus of the present invention, the ozone generator further contemplating as exemplary features a timer apparatus for providing optimal treatment, as well as a proximity sensor system for sensing the presence of an animal in the litter area, for controlling the ozone generator.

20 Claims, 6 Drawing Sheets

U.S. PATENT DOCUMENTS

| | | |
|---|---|---|
| 6,085,540 A | 7/2000 | Davis |
| 6,312,507 B1 | 11/2001 | Taylor et al. ............... 96/19 |
| 6,325,971 B1 | 12/2001 | Hayes |
| 6,403,033 B1 | 6/2002 | Gutman |
| 6,561,131 B1 | 5/2003 | Schwartz ............... 119/166 |
| 6,582,608 B1 | 6/2003 | Miller |
| 7,007,635 B2 | 3/2006 | Kincaid ............... 119/169 |
| 2005/0224005 A1 | 10/2005 | Kim ............... 119/163 |

\* cited by examiner

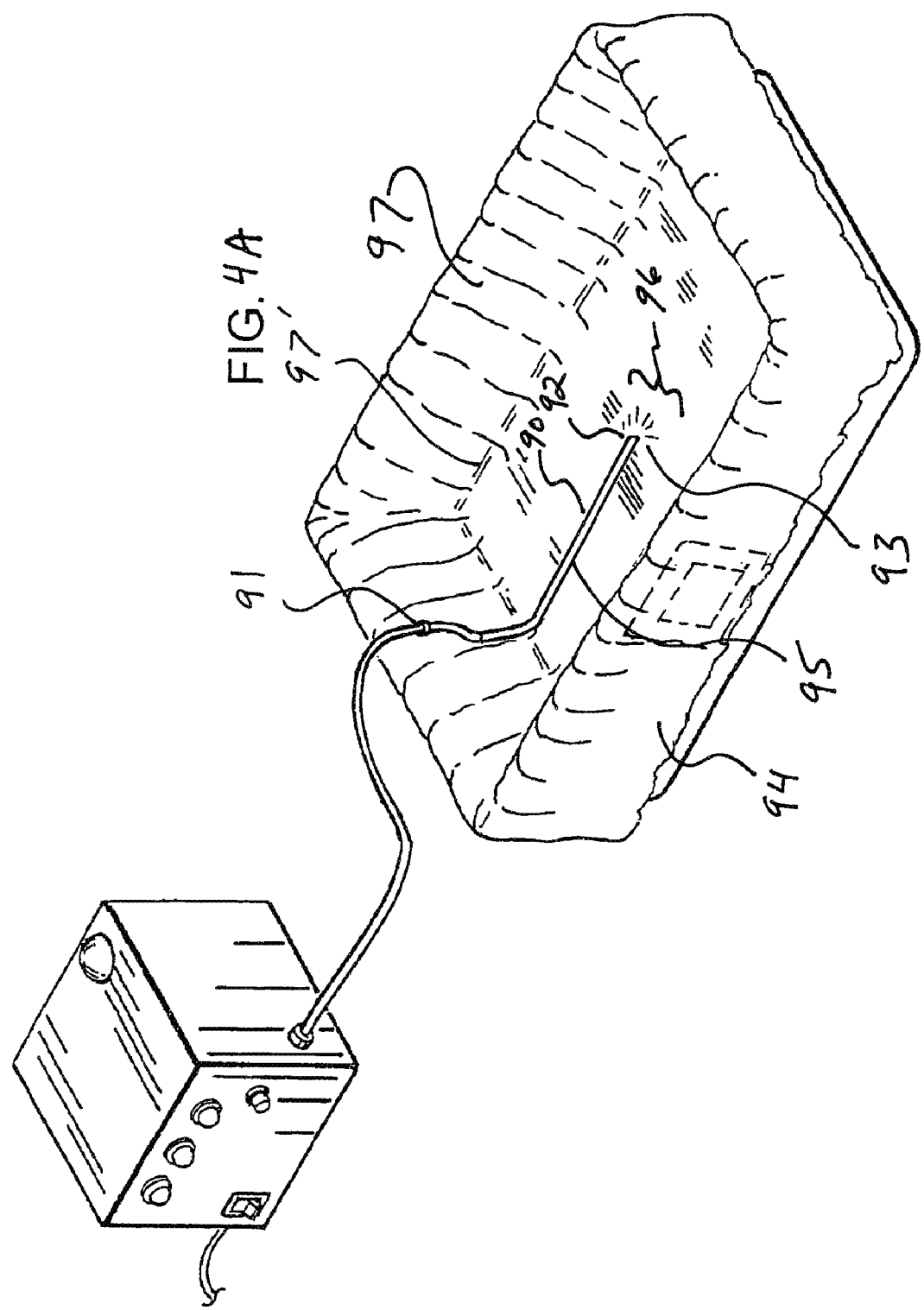

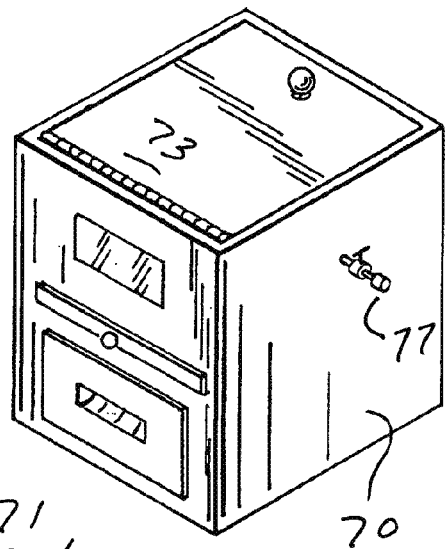
FIG. 8
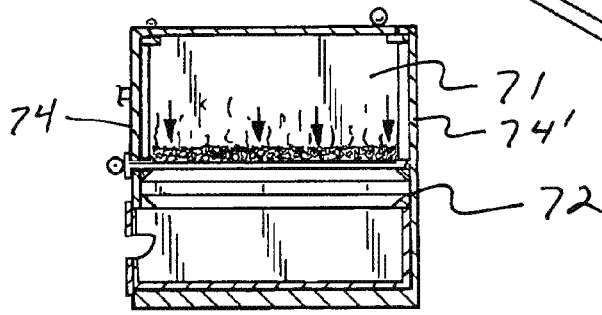
FIG. 11
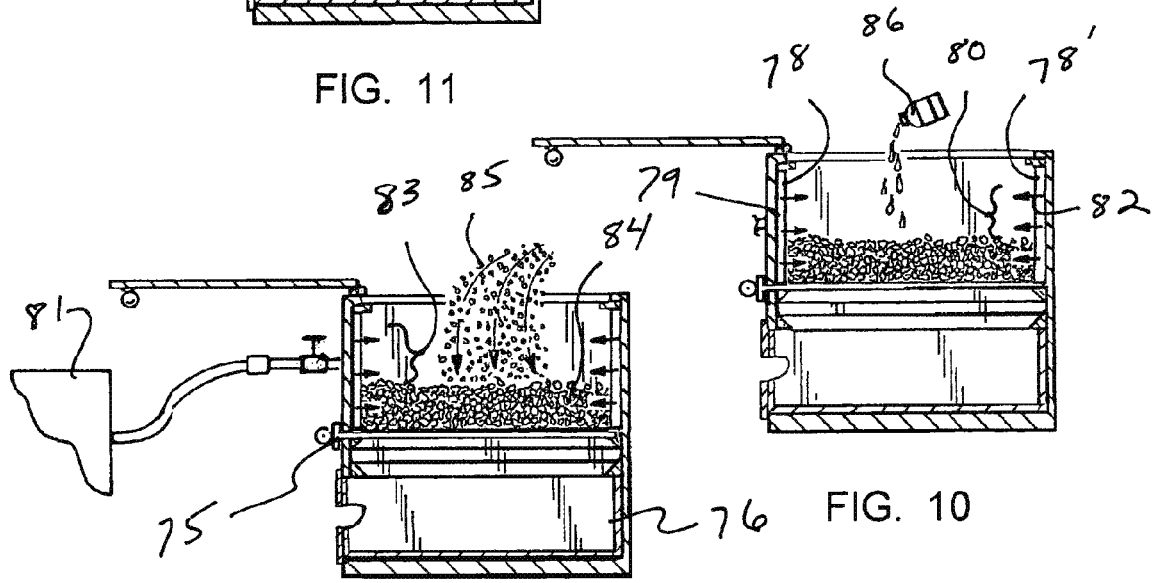
FIG. 10
FIG. 9
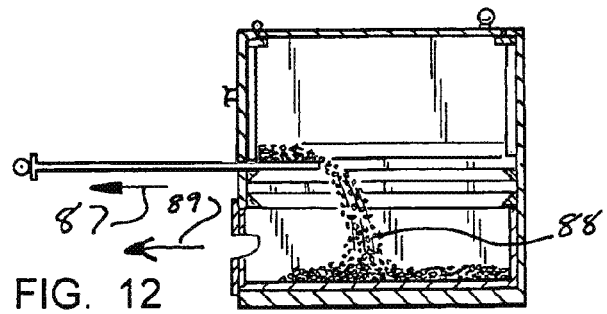
FIG. 12

DEODORIZER/DISINFECTANT FLUID TREATMENT SYSTEM AND LITTER LINER FOR USE THEREWITH

PRIORITY CLAIM

The present application is a continuation of U.S. patent application Ser. No. 11/094,020 filed Mar. 30, 2005 now abandoned listing as inventor Laura Sutis Cressy, and entitled "Deodorizer/Disinfectant Fluid Treatment System and Litter Liner for use Therewith".

TECHNICAL FIELD OF THE INVENTION

The present invention relates to systems for diffusing a fluid deodorizing and/or disinfecting and treatment medium such as ozone gas or the like, the present invention incorporating a fluid conduit associated with a liner for lining an area to be treated. An exemplary embodiment of the present invention teaches a liner for use with such enclosures such as animal litter boxes or the like, and more particularly to a system for lining the container containing waste with an absorption medium, utilizing said liner configured to dispense a treatment fluid throughout said absorption medium, to deodorize and renew same.

A complimentary system to the present invention teaches a deodorization, disinfectant, treatment bin for treating litter infused with animal waste, which treatment bin includes a treatment area which may include a diffusion panel associated therewith for diffusing treatment fluid such as ozone into the treatment area to treat the contaminated litter, rendering same re-useable.

The system of the present invention further contemplates an ozone generator having a timer circuit for providing a flow of ozone to the apparatus of the present invention for a predetermined period, the ozone generator further contemplating as exemplary features a proximity sensor system for sensing the presence of an animal in the litter area, to control the initiation of the treatment process.

BACKGROUND OF THE INVENTION

Certain domesticated animals within a household setting, such as cats, are not easily house trained, and require the use of a means of collecting and disposing of liquid and solid waste. A long known and used method of such waste collection and isolation involves the placement of a tray or other container filled with an odor and liquid absorbing medium such as kaolin clay or the like, upon which the animal deposits the waste and typically covers same, allowing the medium to absorb the waste and isolate the odors.

After a specified period of time, the medium becomes infused with the waste and is no longer effective at absorbing and isolating the odors of same. The infused medium must then be disposed, an unsanitary and time consuming process. Further, the cost for renewing the medium can add up over time.

Cat box liners are not particularly new and generally take the form of a bag-like structure whose mouth is folded over the periphery of the tray and the litter or other medium poured thereupon. After the medium is spent, the liner may be removed from the edges of the tray, and lifted to contain the waste infused medium for disposal.

The known prior art has failed to contemplate a system for renewing the waste infused litter situated within the litter box, to effectively extend the time the litter may be used, or further disinfecting the litter box area, or effectively recycle waste infused litter and make same suitable for re-use.

GENERAL SUMMARY DISCUSSION OF THE INVENTION

The present invention relates to gas and liquid contact apparatus and systems therefore, and particularly to systems for deodorizing, disinfecting, and treating matter, the present invention more particularly contemplating a system for lining a container for containing liquid and/or waste in an absorption medium, utilizing a liner configured which may include a conduit to disperse a deodorizing fluid into the waste, the liner containing the deodorizing fluid about the waste so that the waste is treated by the deodorizing fluid.

The preferred embodiment of the present invention contemplates a liner configured for utilization in conjunction with a cat box containing litter or the like, the liner being formed of thin film or the like and which may have associated therewith a fluid conduit which may or may not contain a further dispersal medium such as a passage, panel, hose or the like to provide a distributed flow of a fluid medium containing, for example, ozone gas or the like. The ozone may also be simply piped into the litter via a hose or other conduit, which may or may not be connected to the liner.

In use, the preferred embodiment of the liner is placed into a cat box or other container to line same, the dispersal and/or diffusion medium preferably associated with the floor and/or lower sidewalls of liner. A litter medium such as kaolin clay or other litter is applied upon the floor of the liner to partially fill the tray. Ozone or another fluid medium is piped to the dispersal or diffusion medium as needed to infuse the litter, and treat any waste associated therewith.

The present system includes apparatus and method for deodorizing an area utilizing a liner associated which may include a diffusion medium, which apparatus and method may be utilized with a variety of applications, and is not limited to the exemplary system associated with a cat box.

A complimentary system to the present invention teaches a deodorization, disinfectant, treatment bin for treating litter infused with animal waste, which treatment bin includes a treatment area having diffusion panel associated therewith for dispensing treatment fluid such as ozone into the treatment area to treat the contaminated litter, rendering same re-useable.

The system of the present invention further contemplates an ozone generator having a timer circuit for providing a flow of ozone to the apparatus of the present invention for a predetermined time, ideally providing sufficient flow of the treatment fluid to fill the litter tray, so as to infuse the litter with treatment fluid, the ozone generator further contemplating as features a delay timer apparatus for providing optimal treatment, as well as a proximity sensor system for sensing the presence of an animal in the litter area, for controlling the ozone generator.

The present system includes apparatus and method for deodorizing an area utilizing a liner associated with a diffusion medium, which apparatus and method may be utilized with a variety of applications, and is not limited to the exemplary system associated with a cat box.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 4A is an isometric view of an embodiment of the present invention, wherein there is provided a hose for dispersing ozone into the tray, which hose may be associated with the liner.

FIG. 8 is an isometric view of a litter bin receiving system for recycling used litter.

FIG. 9 is a side, cut-away view of the system of FIG. 8, wherein used litter is poured into the upper bin of the unit and the ozone generator is engaged to the unit.

FIG. 10 is a side, cut-away view of the system of FIG. 9, wherein ozonated air is pumped through porous sidewalls in the upper bin via the ozone generator, infusing the litter and waste with ozone.

FIG. 11 is side, cut-away view of the ozonated, dried litter of FIG. 10 after processing, providing recycled litter.

FIG. 12 is a side, cut-away view of the system of FIG. 11, wherein the floor of the upper bin is removed, dumping the recycled litter into a lower drawer for removal and re-use.

DETAILED DISCUSSION OF THE INVENTION

Figure 1:
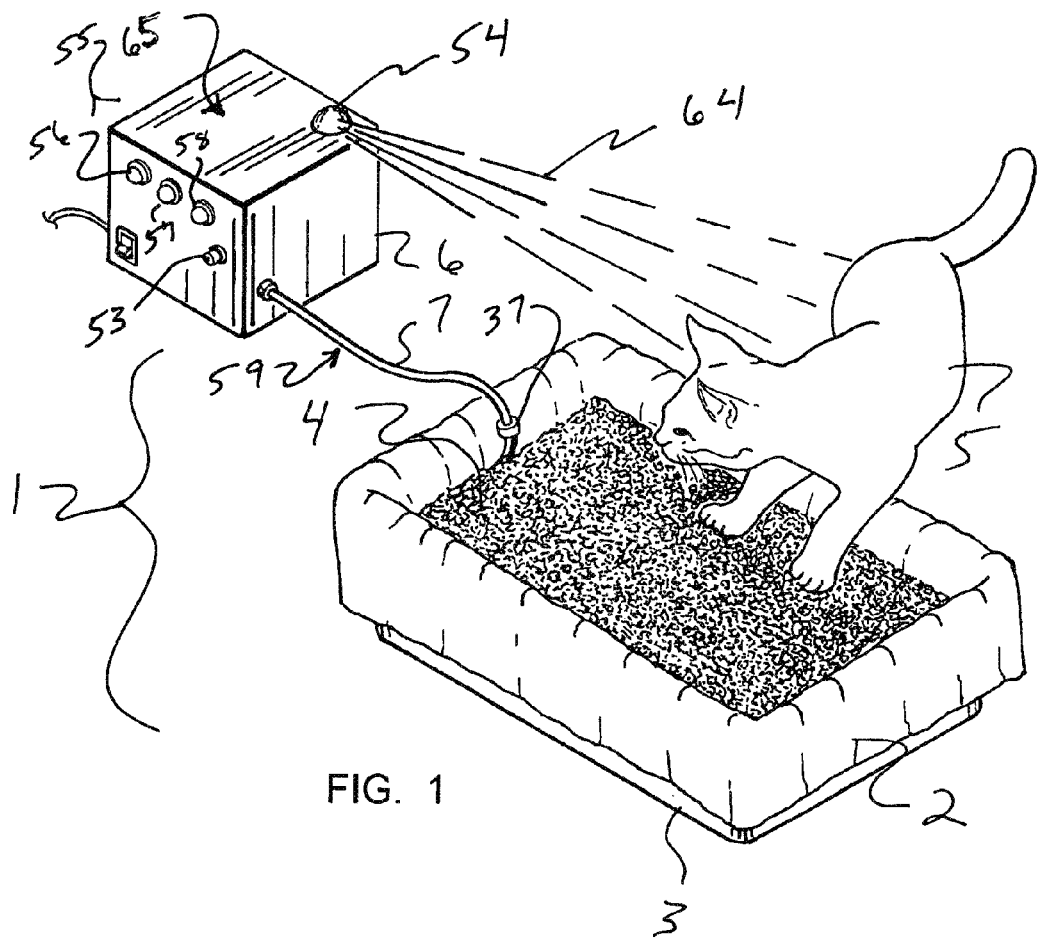
FIG. 1 is an isometric view of the system of the present invention installed in a cat litter box, illustrating a cat approaching the litter box and an ozone generator unit sensing the cat via a proximity sensor, thereby engaging a timing circuit for processing of the cat litter.
Figure 2:
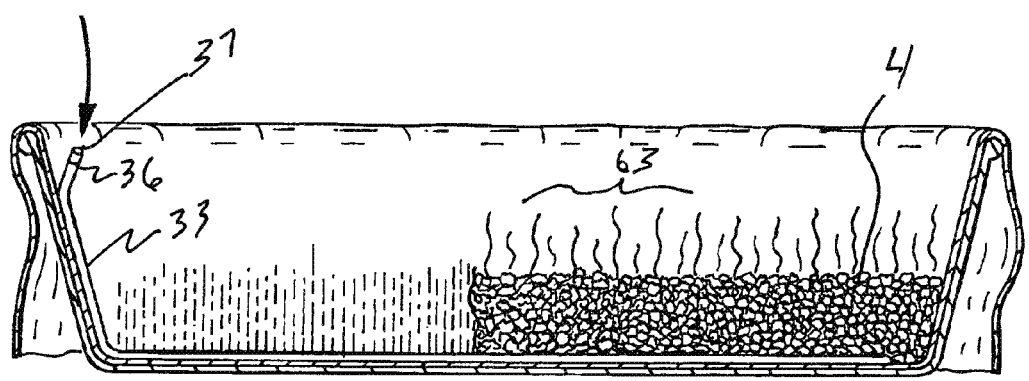
FIG. 2 is a side, partial cut-away view of the line or FIG. 1, illustrating a view of the flow conduit formed in the liner for directing the ozonated air to the area of the liner under the cat litter, where it is dispersed/diffused into the cat litter.
Figure 3:
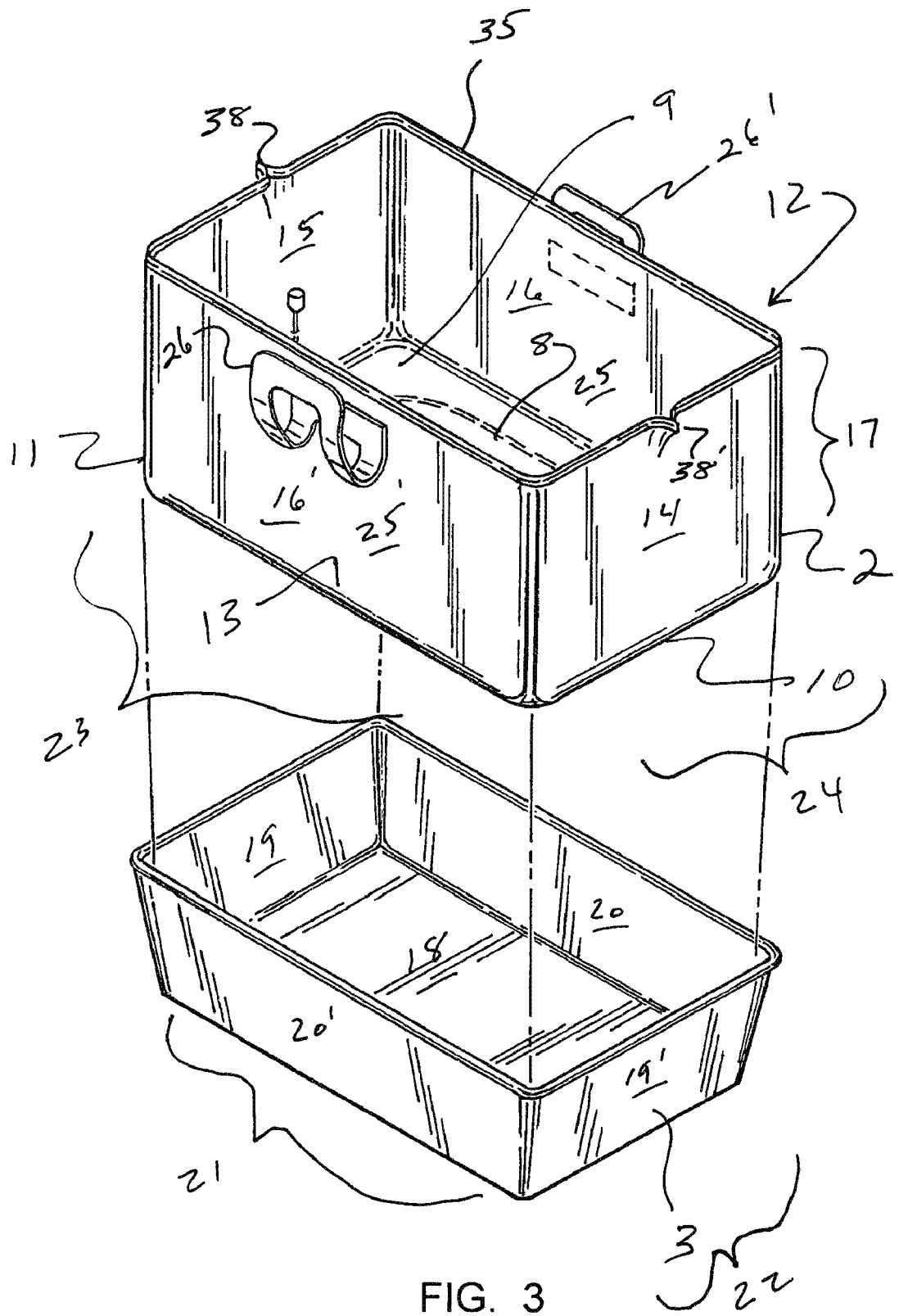
FIG. 3 is an isometric view of an exemplary liner of FIG. 1 and its placement into a litter box such that the sides fold over the side walls of the litter box, providing handles for conveying the litter/waste mixture upon completion of use.

Referring to FIGS. 1-3, an exemplary embodiment of the present invention 1 comprises a liner 2 for a litter tray 3 containing litter 4 for use by an animal 5 such as a cat, for example, for the deposit of waste thereon.

A fluid deodorizer such as an ozone/air gas mixture is provided by a generator 6 which is directed via a tube 7 or the like to a diffuser 8 associated with the base 9 (the support surface upon which the litter is placed) forming the liner. The liner preferably has first 10 and second 11 ends having first 14 and second 15 side walls emanating therefrom, the liner further having first 12 and second 13 sides having first 16 and second 16' sidewalls emanating therefrom, the sidewalls engaging the end walls to form a containment area there between.

As shown, the litter tray 3 or container has a base 18 or support surface having first 19 and second 19' end walls and first 20 and second 20' sidewalls which join to form a containment area, the pan having a length 21 and width 22.

The liner 2 has a length 23 and width 24 sufficient to cover and envelope the containment area of the litter tray, the side and end walls of the liner preferably having a height 17 greater than the walls of the litter tray to allow a portion of the liner to be folded over the walls of the litter tray 3 for securing and adequately lining same. An exemplary measurement of the liner may be, for example, about 11" width by 17" length by 4" sidewall height.

The liner is preferably formed a flexible or flaccid film, the main portion of the liner forming inner 25 and outer 25' walls, the inner 25 walls forming the containment area, the outer 25' walls engaging the litter tray 3 or the like.

The liner may have mounted to its outer walls 25 in the vicinity at the sidewalls 20, 20' first 26 and second 26' handles, to facilitate disposal of spent litter, as will be more fully disclosed herein.

The end 19, 19' and side 20, 20' walls forming the containment area preferably include a top edge 35, and the top edge may be medially divided 38, 38' to provide first 39 and second 39' (or male/female) interlocking strips to allow the liner upper edge to be sealed to form a container for the spent waste, like a bag, with the handles 26, 26' facilitating carrying thereof. Alternatively a draw cord may be provided along the periphery of the mouth or the bag, or a twist-tie may be used to seal the bag for containing the waste/litter for disposal or the like.

Continuing with FIGS. 1, 2, 6, 13, and 14, the base or support surface of the preferred embodiment of the liner may have associated therewith a diffuser or the like for distributing a deodorizing fluid such as an air/ozone mixture there through. The diffuser can take various configurations, and may be formed by a manifold-like tube having apertures formed along its length, or a film panel.

In the preferred, exemplary embodiment of the present invention, the diffuser 8 is formed of a film panel 27 having a periphery 28 having an edge, wherein the periphery is sealed 29 to the liner along its edge. The panel has formed there through a plurality of spaced apertures 30, 30', 30", the panel formed to be spaced 31 from the liner upon application of fluid (such as air/ozone mixture) there through.

The panel can be of various sizes or configurations, preferably distributing via the perforations or apertures 30 (or other fluid permeable construction) the deodorizing fluid over an area comprising the base or support surface of the liner.

A passageway 32 communicates with the diffuser panel to deliver the deodorizing fluid from the generator. The passageway can be in the form of a conventional tube, or (as shown in the referenced figures) may be in the form of a contiguous, elongated strip of film sealed 33 along its side edges to the liner, and formed to provide a space there between to form a conduit for the transport of the fluid there through the conduit having an end 37 situated distal the panel, along one of the side or end walls forming the liner. The end 37 may include a connector 37 for connecting a tube or the like thereto, so as to communicate with the generator for other deodorizing fluid source.

Figure 5:
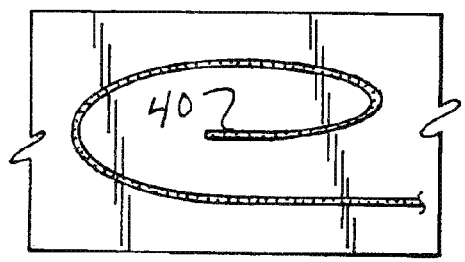
FIG. 5 is an alternative embodiment of the liner of FIG. 4, illustrating a thin film passageway formed in the shape of a spiral, comprising a layer of film affixed on its opposing edges to the liner.
Figure 6:
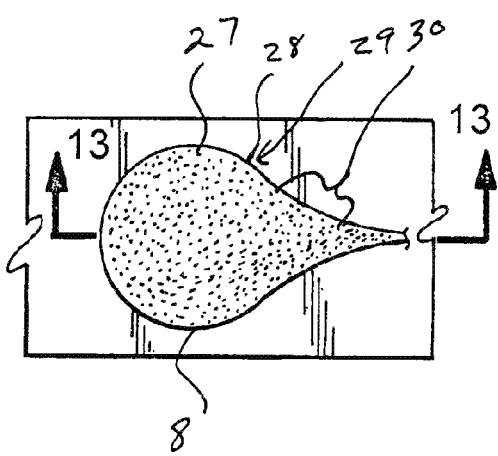
FIG. 6 is a second exemplary embodiment of the liner of FIG. 1, illustrating a flat panel of film having pores formed there through for the diffusion/dispersal of the ozonated air, affixed along its peripheral edge to the liner, but for a non-porous passageway for receiving the ozonated air, forming a diffusion panel.
Figure 7:
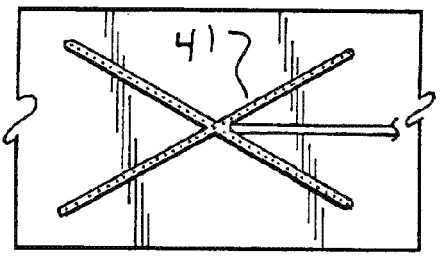
FIG. 7 is an alternative embodiment of the liner of FIG. 4, illustrating a thin film passageway formed in the shape of an "X", comprising a layer of film affixed on its opposing edges to the liner, further including a non-porous passageway for receiving the ozonated air.
Figure 13:
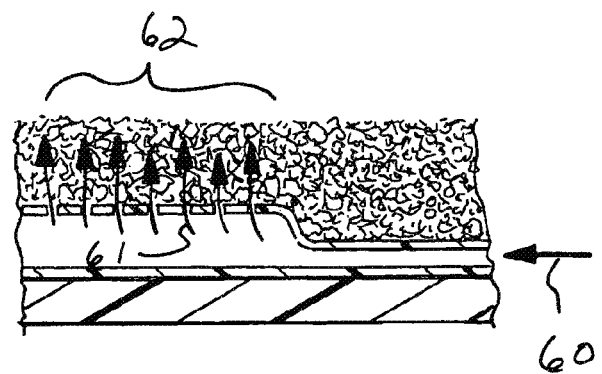
FIG. 13 is a side, cut-away, partially cross-sectional view of the liner of FIG. 6, illustrating the passage of the air/fluid mixture through the passageway formed between the upper film layer and the liner, and the diffusion of ozonated air through the diffusion panel into the cat litter.
Figure 14:
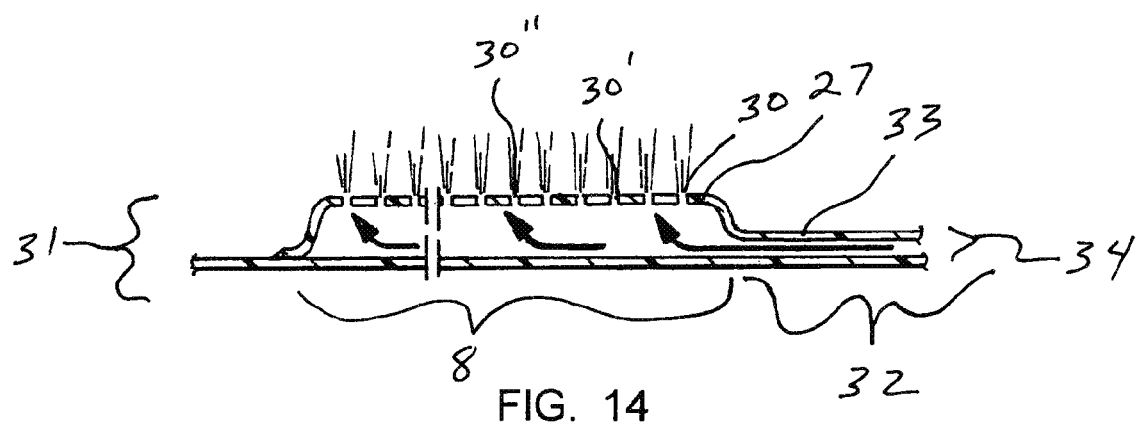
FIG. 14 is a side, cut-away view of the diffusion panel of FIG. 13.

As shown in FIG. 5, the diffuser may take the form of a manifold-like distribution means comprising a length of tubing having apertures (or other fluid permeable construction) formed along its length for the distribution of deodorizing fluid there through, the tubing shown in the configuration of a spiral 40 or the like. This tube may be referred to as a bubble wand or strip As shown in FIG. 7, as an alternative to the above disclosed panel construction (which could have radial edges, linear edges, and may be rectilinear, for example), a diffuser may be formed by strips of perforated (apertures, slits, or otherwise fluid permeable) film sealed along its opposing side edges to form a permeable conduit for diffusion of various configurations, such as, for example, an "X" 41, or other configurations.

Figure 4:
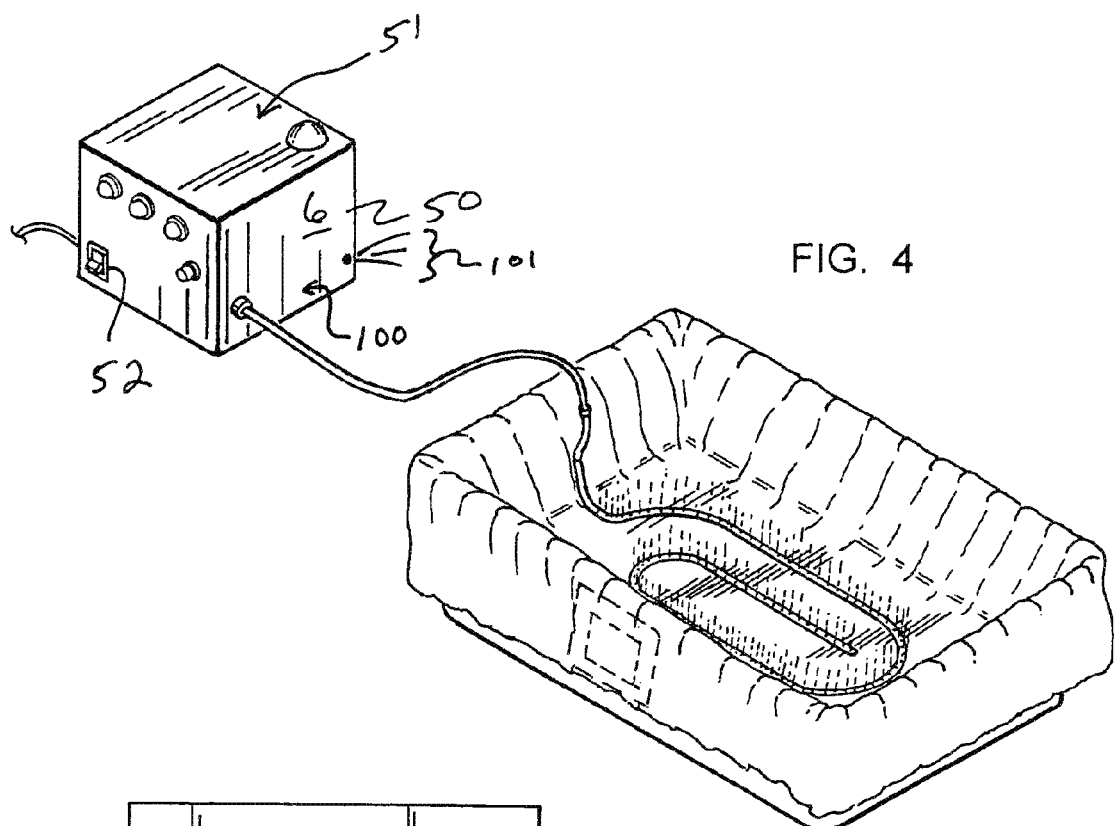
FIG. 4 is an isometric view of an exemplary liner and ozone generator of FIG. 1, wherein the dispersal means associated with the liner utilizes a porous, spirally arranged tube which may be affixed to the liner.

Referring to FIG. 4A, the system of the present invention may not require a diffuser, the ozone/air mixture pumped 96 directly into the litter from the open end of the hose or conduit. In use, the litter, being granular, disperses the ozone, which is heavier than air, while the liner contains the ozone, so that the litter is in effect infused in an ozone (or other deodorizing fluid) bath.

As shown, the hose 90 has first 91 and second 92 ends, the second end preferably being situated in about the lower portion 97' of the sidewalls 97, or center 93 of the liner 94. The hose is preferably affixed 95 or formed as part of the liner, but it is not required.

Continuing with FIGS. 1, 2, 4, 13 and 14, the disinfectant fluid source can be from a variety of sources, the exemplary embodiment in the form of an generator 6 having a cabinet 50 containing an ozone generation apparatus 51, which may be controlled by a power switch 52 to initiate power to the unit, which may be powered via a wall plug, internal battery, or other power source.

The unit of the exemplary embodiment includes a proximity sensor 54, which can utilize infrared (IR) or microwave movement detection to sense the presence of an animal in the vicinity of the litter tray. Accordingly, the proximity sensor 54, in use, should be oriented to detect or sense 64 the animal 5 in the presence of the litter tray 3. Upon detection, the unit can be programmed to initiate a timer circuit 64 upon detecting the animal, the timer deferring disinfecting fluid flow until some period of time after detection has been made, for example, 5 minutes, to allow the animal to complete its business at the litter tray.

Alternatively, the unit can be programmed to initiate the flow of disinfecting fluid after detection of the animal, and after a predetermined period of the sensor sensing no activity so as to discern the animal has left the area. The unit can be further programmed such that the disinfecting flow of fluid to the diffuser is halted if during the time of flow the animal returns to the area. Upon the animal leaving the area, the flow could be made to resume.

Alternatively, the sensor can be separated from the generator 6 by wires or wireless RF communication, and can be mounted to the tray or liner, for example.

After the predetermined period of time has lapsed, the ozone generation apparatus 51 (or other disinfectant fluid) initiates and provides a fluid flow 59 (in the exemplary embodiment, an air/ozone mixture) through the tube 7, through 60 conduit 33 along the liner, to the diffuser, where it passes 61 through the perforations or apertures 30 so that it is diffused 62 through the litter 4, permeating 63 the litter and any animal waste therein. The timer circuit may be programmed to allow ozone generation/fluid flow for a predetermined period of time, for example, 15 minutes, to deodorize, disinfect, and treat any waste left in the litter by the animal.

Ozone is heavier than air, and will fill a container in an undisturbed atmosphere like a liquid. In the present invention, the timer circuit may be programmed for a period of time sufficient to allow the ozone generator to disperse sufficient ozone/air mixture into the lined tray containing the litter/waste to fill the tray to its upper edge, in effect immersing the waste/litter in ozone, infusing same with the ozone treatment fluid.

As an example, in a conventional lined tray measuring 11" wide by 17" long by 6" high, filled with 25 lbs or natural (clay) litter, an ozone generator having a flow rate of 2-3 liters per minute at 0.05-02 mpas, with ozone generation of 200 mg/hr and a with a hose situated upon the liner under the clay to disperse the ozone/air, tests indicate that it takes about four minutes for the ozone to fill the tray up to the top edges of the sidewalls and begin to spill over, in a sealed room with no air flow. Thus, the timer in this example may be programmed to run four minutes for treatment.

The ozone generator may further feature a control interface including indicator lights 55, which may include a timer circuit initiated light 57 to indicate the timer circuit has been initiated, a power light 56 to indicate power, and a cycling light 58 which indicates the disinfecting fluid flow (in the exemplary embodiment ozone/air mixture) for a predetermined period of time.

The ozone generator may further include an aerosol dispenser which may be timed to emit a spray of deodorizer into the area after the ozone has been dispensed, which can further freshen the air as well as depleting the remaining ozone in the area A litter renewal cycle switch 53 may also be provided for use with renewing spent litter utilizing the litter renewal bin, as will be further discussed below.

It is noted that the diffuser of the present invention need not be affixed to or otherwise associated with the liner, and may comprise a structure independent of the liner, upon which could be poured the litter, or which may be otherwise buried into the litter.

It is also noted that a liner is not always required, and the diffuser of the present invention may be utilized without a liner, and that the litter tray or box may have the diffuser structure incorporated as a component therein.

What is important is that the diffuser of the present invention be associated with the litter so as to diffuse into the litter and waste therein the treatment gas, whether it be ozone or another treating or deodorizing fluid.

Exemplary Specifications:

Liner:

Material: High Density Polypropylene (The material indicated is for exemplary purposes. Other materials which are ozone (or other disinfecting fluid used) resistant, and which can contain the litter/waste could likewise be satisfactorily used.)

Thickness: 3 mils

Measurements:

Size: 11" wide by 17" long by 8" high (sidewalls)

Diffusion Aperture size: apertures can vary significantly in size and configuration, and may alternatively take the form of slits, cuts, or porous materials. Also, a diffusion panel may not be required, a hose having an open end situated in the litter, which granular form would appear to diffuse, distribute or disperse the ozone/air to fill the tray may be adequate.

Ozone Generator:

Type: corona field (various types may be utilized)

Flow Rate: 1-3 liters/minute (exemplary embodiment 1.5 liters/minute

Ozone concentration: 50-260 milligrams/hour

Referring to FIGS. 8-12, the present invention also contemplates a recycle bin system which may be utilized with the disinfectant fluid generator (shown as an ozone generator 51 in FIG. 4) discussed supra.

As shown, the recycle bin 70 of the present invention includes upper 71 and lower 72 compartments, the upper compartment having a lid 73 and formed by first 74 and second 74' sidewalls, and a false (removable) floor 75 having a drawer 76 thereunder.

Situated in spaced 79 fashion from the sidewalls 74, 74' are first 78 and second 78' diffusion walls, respectively, each diffusion wall having formed there through a plurality of perforations or apertures for the flow of gaseous fluid there through, while being small enough to retain the litter and waste. A hose coupling is provided to communicate with a disinfecting fluid source (i.e., ozone generator), to direct the disinfecting fluid to the space 79 between the sidewalls and the diffusion walls.

In use, a litter/waste mixture 84 is poured 85 into the upper bin. Essential (scented oils) may be added to reduce the odor. The disinfecting fluid 82 is piped from the fluid source 81 via coupling 77 to the space 79 between the sidewalls and the diffusion walls, where the disinfecting fluid (i.e., ozone/air mixture) is diffused 83 via apertures 80 into the litter/waste mixture. A recycle button (53 in FIG. 1) may be initiated to start the ozone (or other disinfecting fluid generator) for the period of time required to recycle the litter/waste mixture, for example, 3 hours.

After recycling has occurred, the false floor 87 may be slidingly removed, causing the recycled litter to pour 88 into the underlying drawer 76, at which point the drawer may be removed 89 and the litter reused in a litter tray, for example.

Listing of Elements

| Element | Description |
|---|---|
| 1 | System |
| 2 | liner |
| 3 | litter tray/container |
| 4 | litter |
| 5 | animal (cat) |
| 6 | ozone or other gaseous disinfectant |
| 7 | tube |
| 8 | diffuser |
| 9 | base or lower horizontal panel of liner |
| 10 | first end |
| 11 | second end |
| 12 | first side edge |
| 13 | second side edge |
| 14 | first end wall |
| 15 | second end wall |
| 16 | first, second side walls |
| 17 | side wall height |
| 18 | pan base |
| 19 | first, second pan end walls |
| 20 | first second pan side walls |
| 21 | length pan |
| 22 | width pan |
| 23 | length liner |

-continued
Listing of Elements

| Element | Description |
|---|---|
| 24 | width liner |
| 25 | inner, outer walls |
| 26 | first, second handles |
| 27 | diffuser as panel |
| 28 | edge about periphery |
| 29 | sealed to liner at edge |
| 30 | plurality of spaced apertures |
| 31 | panel formed to be spaced from liner upon application of fluid there through |
| 32 | passageway |
| 33 | contiguous film sealed on edge, no apertures to form conduit |
| 34 | formed to be spaced from liner for conduit |
| 35 | edge |
| 36 | end |
| 37 | connector |
| 38, ' | medially divided |
| 39, ' | zip-lock portions |
| 40 | spiral |
| 41 | "X" |
| 50 | cabinet |
| 51 | ozone generation apparatus |
| 52 | power switch |
| 53 | manual cycle switch |
| 54 | proximity sensor |
| 55 | indicator lights |
| 56 | power light |
| 57 | timer circuit initiated light |
| 58 | cycling light |
| 59 | air/ozone mixture |
| 60 | passes |
| 61 | passes |
| 62 | diffused |
| 63 | permeates |
| 64 | senses |
| 65 | timer circuit |
| 70 | recycle bin |
| 71 | upper |
| 72 | lower compartments |
| 73 | lid |
| 74, ' | sidewalls |
| 75 | false floor |
| 76 | drawer |
| 77 | hose coupling |
| 78 | diffusion wall |
| 79 | spaced |
| 80 | apertures |
| 81 | fluid source (i.e. generator) |
| 82 | disinfecting fluid |
| 83 | diffused |
| 84 | litter/waste mixture |
| 85 | poured |
| 86 | essential (scented) oils |
| 87 | false floor slidingly removed |
| 88 | recycled litter into drawer |
| 89 | removed and reused |
| 90 | hose |
| 91 | first end |
| 92 | second end |
| 93 | center |
| 94 | liner |
| 95 | affixed |
| 96 | pumped |
| 97, ' | sidewalls, lower portion |
| 100 | ozone dispenser |
| 101 | spray |

Referring to FIG. 1, 1o prevent the liner from being oxidized by the ozone, the ozone generator may further include a cumulative timer which indicates when it is time to change the bag via a light or display, ex, after 50 hours of total operation. After changing the bag, the user could, for example, push a button, to reset the timer.

The invention embodiments herein described are done so in detail for exemplary purposes only, and may be subject to many different variations in design, structure, application and operation methodology. The use of "diffuser", "manifold", and like terms are not intended to be limiting, referencing the dispersal, dispensing, and distribution of the fluid into the tray container area. Thus, the detailed disclosures therein should be interpreted in an illustrative, exemplary manner, and not in a limited sense.

What is claimed is:

1. The method of deodorizing an animal litter box having a bottom and side walls, comprising the steps of:
    a. providing a liner of fluid impermeable, flexible film having dimensions to form a fluid impermeable layer over the bottom and side walls of the animal litter box;
    b. forming an elongated strip of fluid impermeable film having a length having first and second ends, and first and second edges;
    c. affixing said first and second edges of said strip of film to said liner, so as to form a conduit between said first and second edges, with said strip of film forming the upper wall of said conduit, and said liner forming the lower wall of said conduit, said conduit having first and second ends;
    d. placing said liner in said litter box;
    e. covering said second end of said conduit with absorbent litter;
    f. allowing an animal to deposit waste upon said absorbent litter;
    g. initiating a flow of treatment fluid through said first end of said conduit;
    h. allowing said treatment fluid to flow through the length of said conduit;
    i. dispersing said treatment fluid into said absorbent litter via said conduit;
    j. repeating steps f-i.

2. The method of claim 1, wherein in step "a" said liner is formed of thermoplastic film.

3. The method of claim 2, wherein in step "b" said strip of film is formed of thermoplastic film.

4. The method of claim 1, wherein after step "c" there is further provided the additional step "ci." of forming perforations in said strip of film in the vicinity of said second end of said conduit, so as to provide a diffuser, while allowing the remainder of said conduit to remain fluid impermeable, for the passage of gas therethrough, such that fluid passing into said first end of said conduit is directed through a fluid impermeable passage formed by said conduit, to said diffuser formed in the vicinity of said second end of said conduit.

5. The method of claim 4, wherein said second end of said conduit is sealed to facilitate passage of fluid through said perforations forming said diffuser.

6. The method of claim "5", wherein said treatment fluid comprises ozone gas.

7. The method of claim "4", wherein there is the step in step "g" of sensing the presence of an animal in the vicinity of said tray, then sensing the absence of the presence of the animal in the vicinity of said tray, to automatically initiate the flow of treatment fluid.

8. The method of claim "7", wherein in step "g" said treatment fluid is dispersed through said litter for a predetermined period of time.

9. The method of claim "7", wherein in step "g" said treatment fluid is dispersed through said litter via said conduit in a measured volume so as to substantially fill said tray, so as to contact said treatment fluid with the full quantity of said litter therein.

10. The method of claim "5", wherein in step "c" said conduit is formed such that, when said liner is mounted to a litter box, said first end of said conduit is situated adjacent to one of said sidewalls of said litter box, and said second end of said conduit is situated adjacent to the bottom of said litter box.

11. The method of treating material, utilizing a container having a bottom and side walls, comprising the steps of:
    a. providing a liner of fluid impermeable, flexible film having dimensions to form a fluid impermeable layer over the bottom and side walls of the container;
    b. forming an elongated strip of fluid impermeable film having a length having first and second ends, and first and second edges;
    c. affixing said first and second edges along said length of said strip of film to said liner, so as to form a conduit between said first and second edges, with said strip of film forming the upper wall of said conduit, and said liner forming the lower wall of said conduit, said conduit having first and second ends;
    d. placing said liner with said conduit in said container;
    e. covering said second end of said conduit with said material;
    f. allowing a liquid to be deposited upon said material, and allowing said material to absorb said liquid, providing absorbed liquid;
    g. initiating a flow of a treatment gas through said first end of said conduit;
    h. allowing said treatment gas to flow through the length of said conduit;
    i. dispersing said treatment gas into said material and said absorbed liquid via said conduit;
    j. repeating steps f-i.

12. The method of claim 11, wherein in step "a" said liner is formed of thermoplastic film.

13. The method of claim 12, wherein in step "b" said strip of film is formed of thermoplastic film.

14. The method of claim 11, wherein after step "c" there is further provided the additional step "ci." of forming perforations in said strip of film in the vicinity of said second end of said conduit, so as to provide a diffuser, while allowing the remainder of said conduit to remain fluid impermeable, for the passage of gas therethrough, such that said treatment gas passing into said first end of said conduit is directed through a fluid impermeable passage formed by said conduit, to said diffuser formed in the vicinity of said second end of said conduit.

15. The method of claim 14, wherein said second end of said conduit is sealed to facilitate passage of fluid through said perforations forming said diffuser.

16. The method of claim "15", wherein said treatment fluid comprises ozone gas.

17. The method of claim "14", wherein there is the step in step "g" of sensing the presence of a user in the vicinity of said tray, then sensing the absence of the presence of the user in the vicinity of said tray, to automatically initiate the flow of treatment gas.

18. The method of claim "17", wherein in step "g" said treatment gas is dispersed through said material via said conduit in a measured volume so as to substantially fill said tray, so as to contact said treatment gas with the full quantity of said litter therein.

19. The method of claim "15", wherein in step "c" said conduit is formed such that, when said liner is mounted to a container box, said first end of said conduit is situated adjacent to one of said sidewalls of said container, and said second end of said conduit is situated adjacent to the bottom of said container.

20. The method of deodorizing an animal litter box having a bottom and side walls, comprising the steps of:
   a. providing a liner of fluid impermeable, flexible film having dimensions to form a fluid impermeable layer over the bottom and side walls of the animal litter box;
   b. forming an elongated strip of fluid impermeable film having a length having first and second ends, and first and second edges;
   c. affixing said first and second edges of said strip of film to said liner, so as to form a flexible conduit between said first and second edges, with said strip of film forming the upper wall of said conduit, and said liner forming the lower wall of said conduit, said conduit having first and second ends;
   d. placing said liner in said litter box;
   e. covering said second end of said conduit with absorbent litter;
   f. allowing the deposit of liquid upon said absorbent litter, providing absorbed litter;
   g. initiating a flow of treatment gas through said first end of said conduit;
   h. utilizing said conduit to contain and direct said treatment gas through the length of said conduit so as to disperse said treatment gas through said absorbed litter via said conduit;
   i. repeating steps f-h.

* * * * *